United States Patent
Ahnlund et al.

(10) Patent No.: US 7,164,916 B1
(45) Date of Patent: Jan. 16, 2007

(54) METHOD FOR QUALITY MEASUREMENT IN A MOBILE TELECOMMUNICATIONS SYSTEM

(75) Inventors: Hans Ahnlund, Singapore (SG); Alexander Esser, Espoo (FI); Philip Wesby, Espoo (FI); Teppo Tossavainen, Espoo (FI)

(73) Assignee: Nokia Corporation, Espoo (FI)

(*) Notice: Subject to any disclaimer, the term of this patent is extended or adjusted under 35 U.S.C. 154(b) by 275 days.

(21) Appl. No.: 10/070,410

(22) PCT Filed: Sep. 5, 2000

(86) PCT No.: PCT/IB00/01323

§ 371 (c)(1),
(2), (4) Date: Aug. 16, 2002

(87) PCT Pub. No.: WO01/19114

PCT Pub. Date: Mar. 15, 2001

(30) Foreign Application Priority Data

Sep. 6, 1999 (GB) .................................. 9921007.2

(51) Int. Cl.
*H04Q 7/20* (2006.01)
*H04Q 7/00* (2006.01)

(52) U.S. Cl. ................ 455/437; 455/436; 455/439; 455/438; 455/442; 455/513; 455/464; 455/452.2; 370/331; 370/332; 370/333

(58) Field of Classification Search ................ 455/1, 455/464, 434, 500, 517, 513, 455, 63.3, 450, 455/452.2, 509, 524, 525, 436, 437, 438, 455/439, 442, 422.1, 103; 370/331, 332, 370/333
See application file for complete search history.

(56) References Cited

U.S. PATENT DOCUMENTS

| | | | | |
|---|---|---|---|---|
| 5,093,924 A | * | 3/1992 | Toshiyuki et al. | 455/450 |
| 5,193,109 A | * | 3/1993 | Chien-Yeh Lee | 455/436 |
| 5,369,637 A | * | 11/1994 | Richardson et al. | 370/281 |
| 5,369,798 A | * | 11/1994 | Lee | 455/434 |
| 5,440,561 A | * | 8/1995 | Werronen | 370/337 |

(Continued)

FOREIGN PATENT DOCUMENTS

WO  9715169  4/1997

OTHER PUBLICATIONS

Mouly M. et al, "The GSM system for Mobile Communications", 1992, FR. Lassay-Les Chateaux, Europe Media, pp. 329-341 XP002131901.

(Continued)

*Primary Examiner*—George Eng
*Assistant Examiner*—Huy Phan
(74) *Attorney, Agent, or Firm*—Alfred A. Fressola; Ware, Fressola Van Der Sluys & Adolphson LLP

(57) ABSTRACT

A method for operating a radio telecommunications system comprising a mobile station and one or more cell site units capable of communicating by radio with the mobile station on at least two communication channels; the method comprising: the mobile station receiving signals on each of the communication channels; and the mobile station determining an estimate of the level of interference with signals on each of the communication channels.

17 Claims, 3 Drawing Sheets

U.S. PATENT DOCUMENTS

| | | | |
|---|---|---|---|
| 5,491,837 A * | 2/1996 | Haartsen | 455/62 |
| 5,493,563 A * | 2/1996 | Rozanski et al. | 370/332 |
| 5,594,949 A * | 1/1997 | Andersson et al. | 455/437 |
| 5,606,727 A * | 2/1997 | Ueda | 455/513 |
| 5,649,303 A * | 7/1997 | Hess et al. | 455/63.3 |
| 5,809,401 A * | 9/1998 | Meidan et al. | 455/63.3 |
| 5,822,699 A * | 10/1998 | Kotzin et al. | 455/447 |
| 5,901,357 A * | 5/1999 | D'Avello et al. | 455/454 |
| 5,920,817 A * | 7/1999 | Umeda et al. | 455/437 |
| 5,926,762 A * | 7/1999 | Arpee et al. | 455/447 |
| 5,946,625 A * | 8/1999 | Hassan et al. | 455/447 |
| 5,995,499 A * | 11/1999 | Hottinen et al. | 370/337 |
| 6,091,955 A * | 7/2000 | Aalto et al. | 455/447 |
| 6,138,019 A * | 10/2000 | Trompower et al. | 455/436 |
| 6,151,512 A * | 11/2000 | Chheda et al. | 455/562.1 |
| 6,163,698 A * | 12/2000 | Leitch et al. | 455/450 |
| 6,167,035 A * | 12/2000 | Veeravalli et al. | 370/331 |
| 6,167,269 A * | 12/2000 | Kondo | 455/437 |
| 6,188,900 B1 * | 2/2001 | Ruiz et al. | 455/436 |
| 6,269,087 B1 * | 7/2001 | Nakamura et al. | 370/331 |
| 6,330,450 B1 * | 12/2001 | Wallstedt et al. | 455/447 |
| 6,466,767 B1 * | 10/2002 | Lidbrink et al. | 455/67.11 |
| 6,496,531 B1 * | 12/2002 | Kamel et al. | 375/130 |
| 6,542,743 B1 * | 4/2003 | Soliman | 455/436 |
| 6,574,456 B1 * | 6/2003 | Hamabe | 455/63.3 |
| 6,603,745 B1 * | 8/2003 | Antonio et al. | 370/318 |
| 6,614,770 B1 * | 9/2003 | Kayama et al. | 370/331 |
| 6,711,149 B1 * | 3/2004 | Yano et al. | 370/342 |
| 6,885,866 B1 * | 4/2005 | Wikstedt et al. | 455/436 |
| 2002/0024939 A1 * | 2/2002 | Silventoinen et al. | 370/328 |
| 2002/0093922 A1 * | 7/2002 | Grilli et al. | 370/328 |

OTHER PUBLICATIONS

Mehrotra A, "GSM system engineering" 1997, Artech House Publishers, pp. 223-227. Boston US XP002131902.

* cited by examiner

METHOD FOR QUALITY MEASUREMENT IN A MOBILE TELECOMMUNICATIONS SYSTEM

CROSS-REFERENCE TO RELATED APPLICATIONS

Priority is claimed from International Application PCT/IB00/01323 filed 5 Sep. 2000, which in turn claims priority from Great Britain application GB 9921007.2 filed 6 Sep. 1999.

TECHNICAL FIELD

This invention relates to measuring quality in networks such as cellular radio networks, and especially to measuring signal or service quality in adjacent cells in such networks. In particular, the networks may be bandwidth limited time division multiple access (TDMA) cellular networks or professional mobile radio (PMR) networks e.g. TETRA.

FIG. 1 shows schematically the configuration of a typical wireless cellular telecommunications network. The network comprises a number of base-stations (BSs) 1, 2, 3 etc. Each base-station has a radio transceiver capable of transmitting radio signals to and receiving radio signals from the area of an associated cell 4, 5, 6 etc. By means of these signals the base-stations can communicate with a terminal 7 which may be a mobile station (MS) in the associated cell. That terminal itself includes a radio transceiver. Each base station is connected via a base station controller (BSC) 8 to a mobile switching centre (MSC) 9, which is linked in turn to the public telephone network (PSTN) 10. By means of this system a user of the mobile station 7 can establish a telephone call to the public network 10 via the base station in whose cell the mobile station is located. The location of the terminal 7 could be fixed (for example if it is providing radio communications for a fixed building) or the terminal could be moveable (for example if it is a hand portable transceiver or mobile phone).

If the mobile station 7 moves from one cell to another there is a need for it to switch from communicating with one base station to communicating with another. This process is known as handover. As an example, at location 11 the mobile station 7 communicates with base station 1. If the mobile station 7 moves from location 11 to location 12 along route 13 then at some point it must hand over from communicating with base station 1 to communicating with at least one of base stations 2 and 3. When the mobile station 7 is communicating via base station 1 with another terminal unit 14 the communications data passes across the radio link between the mobile station and the base station 1, fixed wire link 15 between the base station 1 and the corresponding BSC 8 and then onward to terminal 14. When the mobile station 7 is communicating with the other terminal unit 14 via, say, base station 2 the communications data passes across the radio link between the mobile station and the base station 2, fixed wire link 16 between the base station 2 and the corresponding BSC 8 and then onward to terminal 14.

In TDMA systems each mobile station communicates with an associated base station in an allocated time slot and on a certain carrier frequency, which may also be allocated. In most such systems it is the responsibility of the respective BSC to control signal quality in the system. If signal quality between a certain mobile station and the associated base station is low then the BSC can control the mobile station or the associated base station to increase its transmission power or control the mobile station to hand over to another base station, with the aim of increasing signal to interference ratio. If signal quality is excessively high then transmission power can be reduced to reduce interference and conserve battery power. Examples of such a system are those that operate according to the GSM (Global System for Mobile Communications) protocol.

Signal quality could be estimated by means of bit error rate, field strength signal to interference ratio or other means. In order to estimate signal quality it is normal for a mobile station to estimate the field strength of a principal carrier frequency for each of the cells near the mobile station's current location. These estimates are reported to the base station that is currently serving the mobile station—that is the base station with which the mobile station is currently associated for the communication of traffic data. A list of principal carrier frequencies for the nearby cells is stored by the BSC, which causes base stations under its control to use their control channels to transmit that list to mobile stations.

In a system such as GSM, the frame structure of the TDMA transmission protocol provides a sufficient period between transmissions that a mobile station is able to retune to a different frequency to measure the field strength of the principal carrier frequency of another cell on that frequency. In other systems a mobile station may be able to communicate with more than one base station simultaneously. Each base station transmits on its principal carrier frequency at maximum power so that the mobile station is able to make a baseline comparison of the field strengths of different adjacent cells. If a base station serves more than one cell then it uses a different principal frequency for each of those cells.

This method has a number of problems. It only permits a relative measure of the field strength of an adjacent cell to be determined; the relative measure could be influenced by substantial co-channel interference on the principal carrier frequency, making the frequency unsuitable for handover. The field strength comparison only gives an indication of the strengths of the principal carrier frequencies of different cells and no information about the other carrier frequencies in those cells. It may happen that when a mobile station is handed over to an adjacent cell whose principal carrier frequency has been determined to have the strongest monitored field strength, at another carrier frequency there is so much co-channel interference that the mobile station is unable to communicate; therefore if such a handover were made the call would be dropped. Therefore, when a handover is taking place a BSC must hold available the previously allocated time slot in the cell previously serving the mobile station until the handover to the new cell is confirmed as successful. Then, if the level of interference is so high that the handover would be unsuccessful the mobile station can be handed back to the previous serving cell. This arrangement reduces network capacity because it requires two slots to be held open during a hand over.

WO 97/15169 describes an arrangement where signal strength measurements are made by the mobile station, the signal strength measurements are delayed when the mobile is transmitting and receiving on a channel and then more frequent signal strength measurements are made when there is no communication. An alternative arrangement described in this document describes the mobile station "stealing" one or more time slots to perform the signal strength measurements by ignoring its task of receiving and/or transmitting information.

There is therefore a need for a way to determine more accurately the quality of service that can be expected on a new carrier frequency to which a mobile station may be handed over, for example by means of estimating field strength and co-channel interference on that new carrier frequency.

It would also be desirable to reduce the amount of co-channel interference on a cell's principal carrier frequency. Such a solution could allow a network incorporating IUO (intelligent underlay overlay) to carry an even greater capacity of traffic. Present schemes for IUO networks involve a relatively loose cellular reuse pattern of principal carrier frequencies—often termed the regular TRX (transmission) frequencies. Each of those frequencies carries control channel information for its cell and is transmitted at constant maximum power. A relatively tight reuse pattern is employed for the other carrier frequencies in each cell—termed the super TRX frequencies. IUO is an interference-limited solution best employed for high capacity urban mobile telecommunications networks.

SUMMARY OF THE INVENTION

According to one aspect of the present invention there is provided a method for operating a radio telecommunications system comprising a mobile station and one or more cell site units capable of communicating by radio with the mobile station on at least two communication channels; the method comprising: the mobile station receiving signals on each of the communication channels; and the mobile station determining an estimate of the level of interference with signals on each of the communication channels.

The method may also comprise the step of transmitting to the mobile station information specifying the communication channels. The mobile station may suitably store that information. In the step of receiving signals the mobile station preferably receives signals on the channels as transmitted to it. The said information specifying the communication channels suitably specifies a frequency for each of the communication channels. The mobile station may then, in the said step of receiving, receive signals on communication channels whose carrier frequencies are specified by the said information.

Having determined estimated levels of interference the mobile station preferably transmits information defining some or all of those estimated levels to a cell site unit information indicating the estimated levels of interference. If only some of the levels of interference are transmitted then those are preferably the lowest levels of interference.

Preferably the mobile station is in traffic communication on a traffic communication channel, the telecommunications system comprises a handover controller for controlling handover of the mobile station from the current communication channel to another one of the communication channels, and the method comprises the steps of: the mobile station communicating to the handover controller via the current cell site unit information indicating the estimated levels of interference with signals on at least two of the communication channels; and the handover control unit determining to which of the cell site units to hand over traffic communication of the mobile station on the basis of at least that information indicating the estimated levels of interference. The step of the handover control unit determining may comprise determining to which communication channel of one of the cell site units to hand over traffic communication of the mobile station on the basis of at least that information indicating the estimated levels of interference. The handover control unit may determine to hand over to a channel having one of the lowest estimated levels of interference.

According to a second aspect of the present invention there is provided a mobile station for operation in a telecommunications system comprising at least two cell site units each capable of communicating by radio with the mobile station on at least two communication channels; the mobile station comprising: a receiver capable of receiving signals from a cell site units on a communication channel; an interference estimation unit for estimating the level of interference on a communication channel on which the receiver receives signals; and a channel analysis unit coupled to the receiver and the interference estimation unit for causing the receiver to receive signals from each of the cell site units on each of the respective communication channels in turn and receiving from the interference estimation unit an estimate of the level of interference on each of those channels.

The interference estimation unit is suitably capable of estimating the level of interference by performing an error correction and/or signal recovery operation on received signals. The said operation is suitably performed on a training sequence of the received signals. The interference estimation unit may comprise a Viterbi equaliser.

The channel analysis unit may be capable of receiving via the receiver information specifying the said communication channels.

The present invention may be implemented in a TDMA telecommunications system and/or in a cellular telephone system. The present invention is suitably implemented in a GSM system. In a GSM system the handover control unit may be a BSC (base station controller). The cell site unit may be a base-station or a part of a base station.

The present invention may be used to assist in the operation of handovers of the mobile station from traffic communication on one channel to traffic communication on another channel. In one arrangement the handovers may be inter-cell handovers. In that case the communication channels for which a level of interference is estimated are channels of different cells (and therefore different cell site units). In another arrangement the handovers may be intra-cell handovers. In that case the communication channels for which a level of interference is estimated may be channels of the same cell (and therefore the same cell site unit). If the system is capable of performing a general handover operation from one channel to another then the communication channels for which a level of interference is estimated may be of the same or different cells.

The Base Station Controller uses the determined information about the different levels of co-channel interference in the adjacent cells, at the monitored carrier frequencies, together with signalling information including the availability of time slots at those frequencies, to optimise the target cell and target frequency into which the mobile station will be handed over to maximise a successful handover operation.

BRIEF DESCRIPTION OF THE DRAWINGS

The present invention will now be described by way of example, with reference to the accompanying drawings, in which.

BEST MODE FOR CARRYING OUT THE INVENTION

Figure 1:
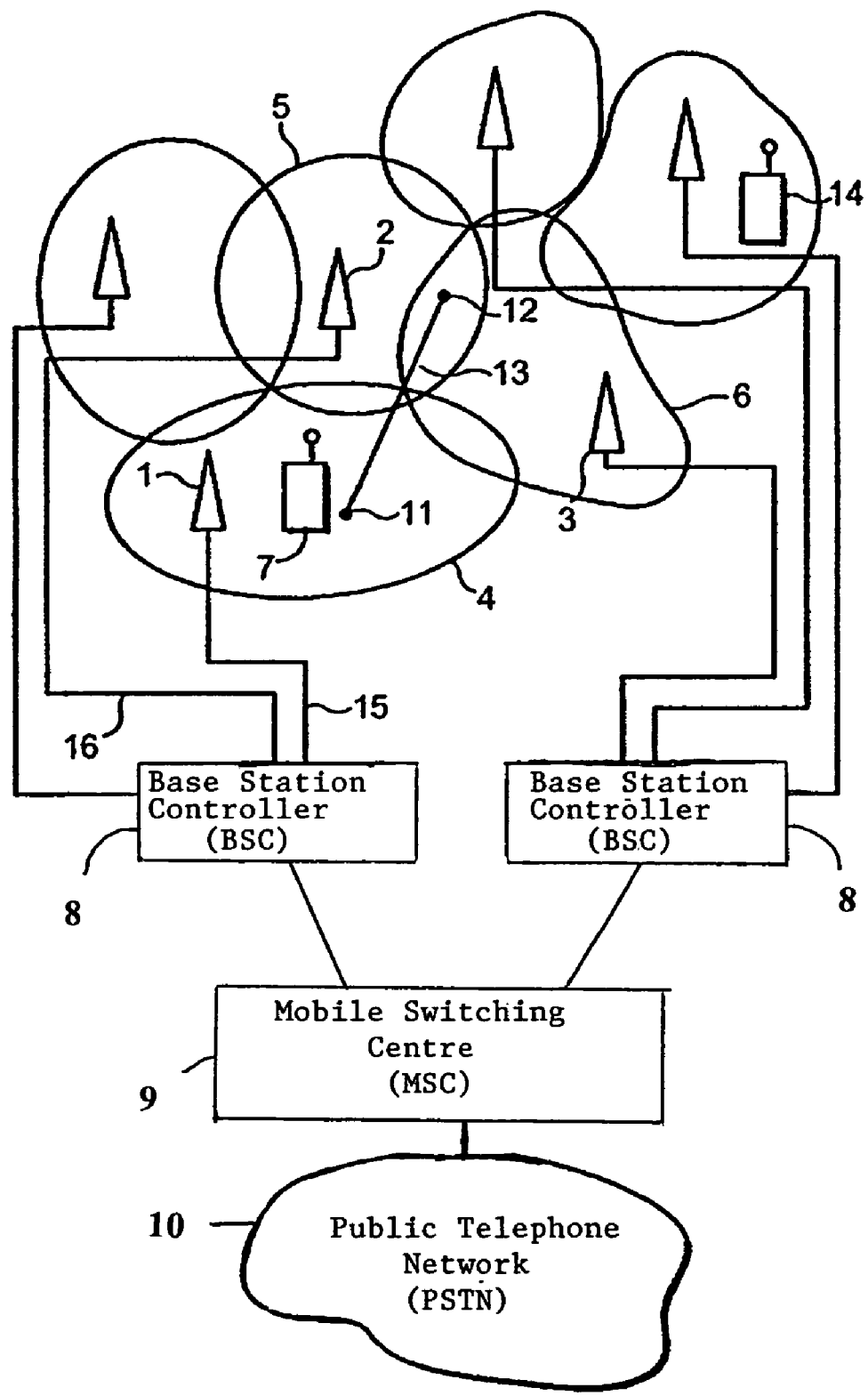
FIG. 1 shows a cellular radio network.
Figure 2:
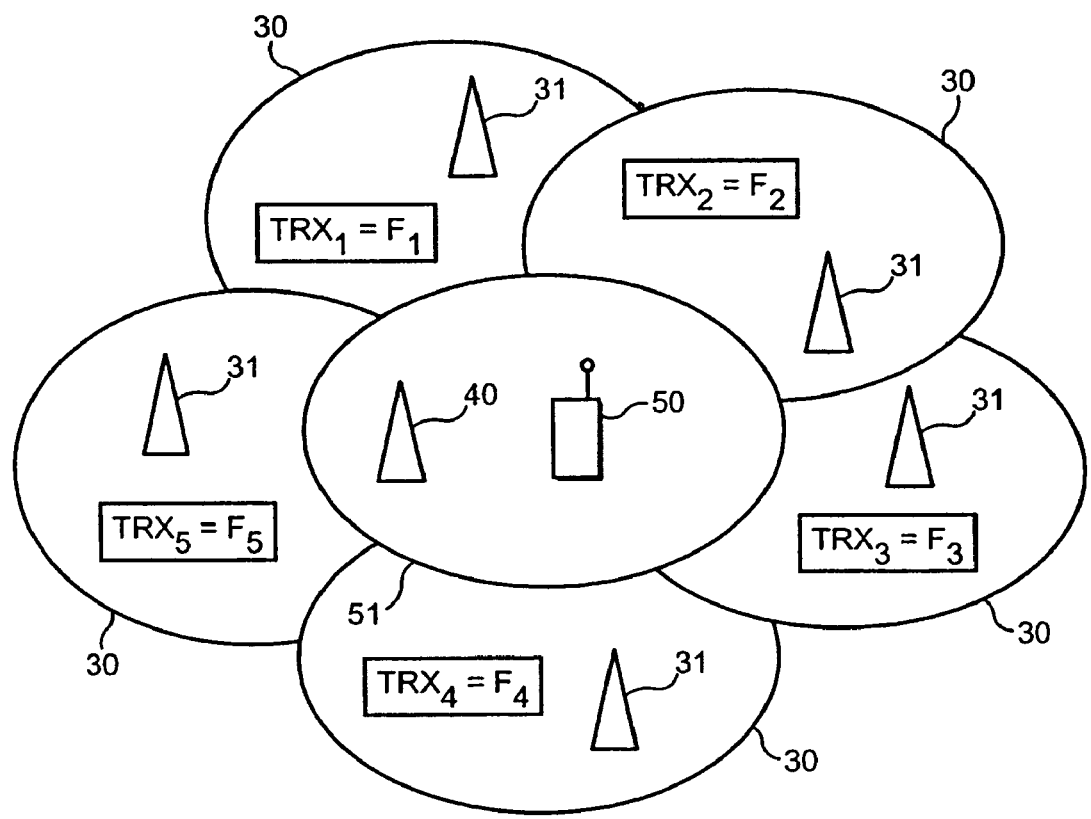
FIG. 2 shows a mobile station and a set of six cells.

FIG. 2 depicts a dedicated mobile station 50 in a central serving cell 51 communicating with the base station 40 of that cell. By way of illustration only is shown a cluster of five adjacent cells 30 each having a first carrier frequency transceiving element denoted TRX1. Following the principles of reuse in a cellular telephone system such as GSM, each of the base stations 31 in the adjacent cells 30 operates at a different principal frequency. The number of adjacent cells is given by way of example only and in no way limits the invention to this number of cells.

The principal transmission frequency from a base station in each cell of a GSM cellular system is transmitted at maximum power. Any additional transmission frequencies in use in the cell, are subject to variable power control. Hence co-channel interference from the base station transceivers predominantly comes from the principal carrier frequency transmissions since these are always transmitted at maximum power. The reason that these do not employ variable power control is to provide a base line comparison of field strengths so that the mobile station is able to gather data so that it can be determined when handovers to adjacent cells must occur.

According to the GSM specification, the mobile station is to receive information on the control channel about the adjacent cells to the one in which it is currently located. The control channel is found on the principal carrier frequency of the serving base station $TRX_1$. Within the frame structure of GSM, the dedicated mobile station is allocated for traffic transmission and reception a time slot comprising one eighth of a time frame. The duration of one time frame is 4.6 ms. In this way the mobile station generally has sufficient time between transmissions with its serving base station to retune to the first carrier frequency $TRX_1$, of an adjacent base station and perform a measurement of that adjacent cell's field strength. The time frames are arranged into a repeating frame structure of 26 time frames. For 25 of the 26 time frames, the dedicated mobile station transmits to the serving base station. Frame 26 is not used for this purpose. Frame 26 provides the possibility for the mobile station to synchronise with an adjacent TRX, to read that base station's identity code (BSIC) which is found on the first time slot of the $TRX_1$. This is necessary to confirm that the field strength measurement is indeed from the adjacent cell with that particular identification BSIC. It can happen that spurious signals from more distant cells operating at the same $TRX_1$ frequency are picked up and measured by the mobile station. The empty time frame, frame 26, occurs every (26×4.6) ms, i.e. every 119.6 ms. IN the best case, this provides the dedicated mobile station sufficient time every one second time interval to synchronise with 8 other first carrier frequencies, one for each of 8 adjacent cells.

In one embodiment of the present invention use is made of this recurring event. While reading the burst which contains the BSIC the mobile station reads the training sequence which comprises a coded sequence present in every burst of GSM transmissions. The training sequence is used to determine the degree by which a transmission may have been corrupted by interference. In one embodiment, the mobile station passes the burst transmission comprising the training sequence, received from an adjacent cell's $TRX_1$ to which the mobile station is synchronised in time frame 26, to the mobile station's Viterbi equaliser. This enables the degree of co-channel interference to be measured using the Viterbi algorithm, which is able to determine the amount of error correction required to restore the received signal to resemble more closely the expected signal as determined by prior knowledge of some characteristic of the signal to be received, such as the training sequence. In this instance, the ability of the Viterbi equaliser to restore a corrupted signal such that the error corrected signal output from the Viterbi equaliser includes the training sequence itself correspondingly provides a measure of the co-channel interference. The Viterbi equaliser can determine a measure of the error correction required to restore the training sequence, or indeed of any expected coded sequence, and correspondingly, the mobile station is able to provide a differential measure of the co-channel interference on the first carrier frequency of the monitored adjacent cells.

The determination of the level of co-channel interference through the analysis of the training sequence is made more accurate and reliable, the more often the mobile station reads the BSIC of the adjacent cell at the first carrier frequency. Correspondingly, it is possible to improve the determination of the level of co-channel interference by enabling the mobile station to read the BSIC more often. This is effected by providing the mobile station with information about the timing differences and the relative frame number offset of the adjacent cells in the broadcast control channel information transmitted on the mobile station's current serving cell. It is through the provision of this timing difference and frame number offset information that the mobile station is able to make intelligent choices as to which BSICs are easier to read and correspondingly attempt to read them in a particular sequence.

More precisely, the information relating to the adjacent cells includes the real-time difference (RTD) between two adjacent cells describing the difference in frame number, and the time frame alignment offset within a frame between a particular adjacent cell and the serving cell.

The RTD between a particular adjacent cell and a mobile station's serving cell can be transmitted by the network on the control channel. This enables the mobile station to pre-determine when approximately the BSIC of this adjacent cell will be sent, before the mobile station has read the BSIC the first time. Consequently, the mobile station can schedule its attempts to read the BSICs of several adjacent cells more effectively, which enables the mobile to read BSICs more often. Without this pre-knowledge of when the BSICs will occur, the mobile station must randomly search for the BSICs which requires typically more than one search frame (frame #26). Thus, transmission of RTDs over the broadcast control channel enables more accurate estimates of co-channel interference to be made.

With mobile location technology currently under development, these RTD transmissions are made for a different purpose, and the invention involves a novel use of these RTD transmissions. Correspondingly, no additional signalling load is imposed on the network by the present invention.

In another embodiment of the invention, an alternative coded signal characteristic may be used. If the mobile station has received suitable information from the base station controller via a base station, or which originates from hardware associated with the base station itself, or if the mobile station is pre-programmed with the characteristic that will be received, the Viterbi equaliser can be employed to measure the error correction required to restore a received signal into a form comprising the said characteristic.

Now, by means of the above procedure, instead of a mobile station simply using the empty frame 26 for checking the BSIC code, also the received signal comprises a training sequence and this can be used to estimate a level of co-channel interference on the first carrier frequency $TRX_1$.

Furthermore, this approach may be used to allow more intelligent handover decisions to be made by the system. A conventional GSM handover involves the steps of monitoring the field strength at the first carrier frequency for each adjacent cell, determining the relative difference in field strengths of adjacent cells as an approximate indication of which cell is most likely the closest, and then performing a "blind" handover into a candidate adjacent cell while holding the serving cell time slot in case of co-channel interference in the said candidate adjacent cell. Instead, using the above approach it is possible to prioritise an "intelligent" handover protocol in which the base station controller is programmed to maximise availability of a time slot at the first carrier frequency of the adjacent cell. To achieve this an "intelligent" intracell handover protocol is used. According to that protocol, when an adjacent cell has been identified as having one of the lowest levels of co-channel interference at the respective monitored first carrier frequency, through the monitoring of the level of error-correction necessary to recover a signal from the cell while the mobile station was synchronised to it, that cell can be selected for the mobile station to be handed over to.

Conventional handover procedures do not provide the capability to monitor the degree of co-channel interference on links to nearby cells. In prior art systems it is conventional for provisional handovers to be made "blindly" to any available time slot at any of the available carrier frequencies in a candidate adjacent cell for which a statistical basis for successful handover has been planned in by the network planner. Such systems do not provide for the selective analysis of adjacent cells to improve the likelihood of successful handover based on contemporaneous interference patterns.

A base station controller according to the present invention may employ both the above-described concepts of "intelligent handover protocol" and "intelligent intracell handover protocol". In this arrangement a base station controller can prioritise handover to an adjacent cell at a first carrier frequency for which the co-channel interference has been detected to be lowest or one of the lowest among carrier frequencies of neighbouring cells. Furthermore, the base station controller can prioritise intracell handover from the principal carrier frequency in the new serving cell to one of the other serving cell carrier frequencies $TRX_{2,3,4\ldots N}$.

A similar co-channel interference monitoring method can be employed to select a carrier frequency for intracell handover as has been described for selecting one of the optimum adjacent cells for handover from a previous serving cell to a current serving cell. In an intracell handover it may additionally be advantageous for the base station controller to indicate to the mobile station which carrier frequency in that same cell is to be monitored for interference. Since the mobile station is synchronised with the serving cell it can receive this information according to the normal GSM signalling protocols. This does not increase the workload on the BSC, or the signalling between the BSC and the base station.

Depending on the geographical position of the mobile station within the current serving cell, the co-channel interference of the different carrier frequencies within the same cell may differ substantially. Furthermore, variable power control of other carrier frequencies within the same cell (if this is in use) may make reception of a signal difficult. However, the absence of a signal will logically indicate that the co-channel interference is very low. A further advantage of the intelligent intracell handover protocol is that a characteristic of one of the other carrier frequencies in the same cell can be monitored at any moment (e.g. in any time frame) without having to wait for the time when measuring normally occurs (e.g. in a specified time frame, such as frame 26 in a normal GSM system). This can be done because the mobile station is always already synchronised with its serving cell. The mobile station needs only one time slot to retune to one of the other carrier frequencies, a second time slot to receive a synchronised burst transmission, and a third time slot to retune to its allocated carrier frequency.

It is preferred that the mobile station continues to periodically monitor the co-channel interference of adjacent cells in the manner described above.

Figure 3:
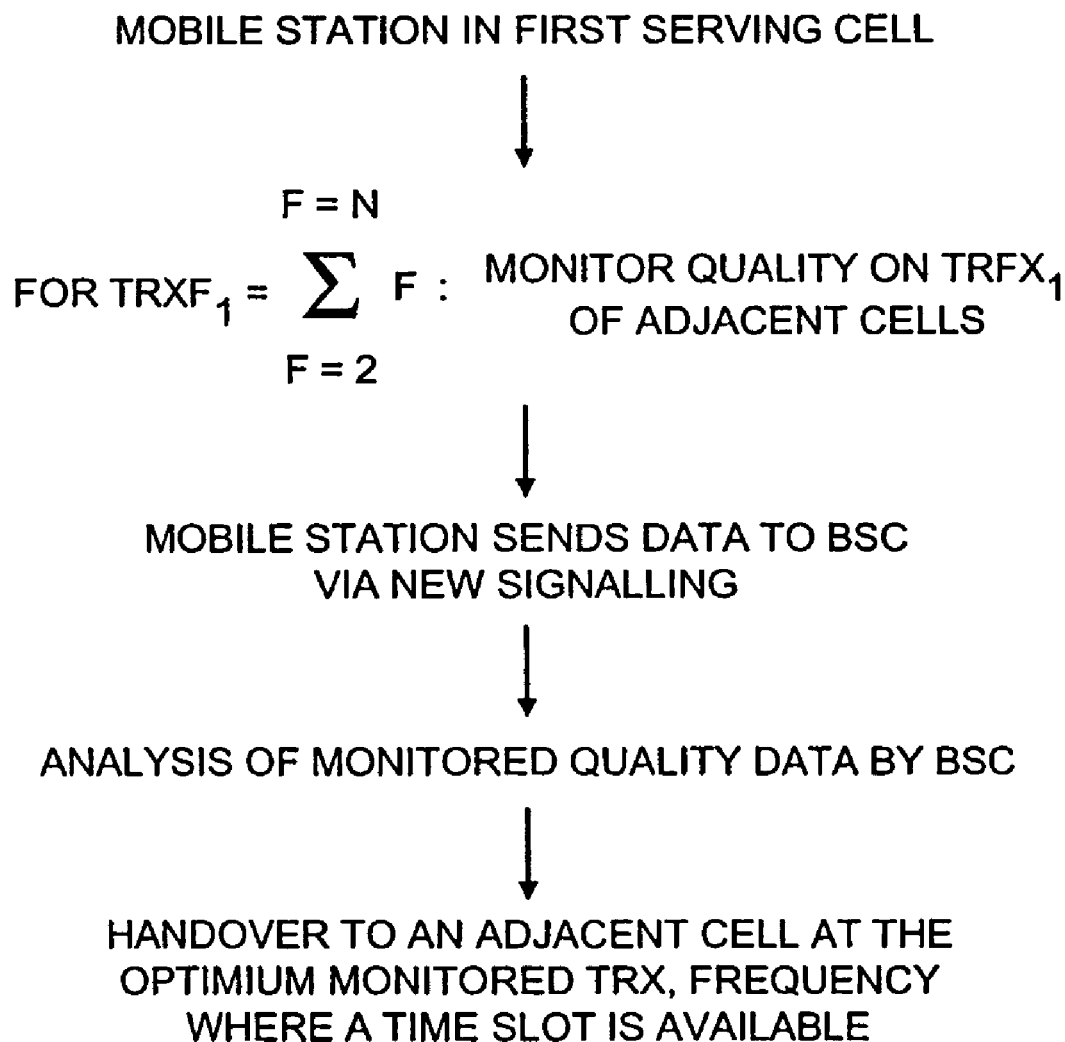
FIG. 3 is a block diagram showing the chain of events in implementing handovers.

FIG. 3 illustrates a non-limiting example of a procedure for handover according to the present invention as implemented in conjunction with a normal GSM system.

The BSC provides the mobile station with a list of the adjacent-cell first carrier frequencies. The mobile station then makes use of frame 26 to monitor the co-channel interference on the first carrier frequency. The mobile station then sends this data to the BSC in order for the BSC to affect an intelligent handover to an adjacent cell at one of the optimum monitored $TRX_1$ frequencies where a time slot is available. While all other standard processes continue, the mobile station is instructed to monitor the co-channel interference on other carrier frequencies $TRX_{2,3,4\ldots N}$ of the new serving cell.

The BSC knows the time slots that are available on the other carrier frequencies within that same serving cell. Therefore, improved and "intelligent" decisions can be made by the BSC to direct the mobile station to investigate, selectively, the co-channel interference at particular time slots at other carrier frequencies in the same cell.

The present invention may provide a particular advantage in the planning of high capacity Intelligent Underlay Overlay (IUO) networks. These networks provide a higher capacity by using a loose reuse pattern of first carrier frequencies, termed "regular carrier frequencies", ($TRX_1$s), and a tighter reuse pattern of additional carrier frequencies, termed "super carrier frequencies", ($TRX_{2,3,4\ldots N}$s). The network planner of an IUO network plans according to statistical probabilities of the use of the network within the limitations of a conventional "blind" handover protocol. By means of an aspect of the present invention an "intelligent" handover protocol can be used, allowing allows the mobile station to gather data to allow an intelligent handover to be effected. If it is assumed that an intelligent handover protocol as described herein will be used then a more efficient use of bandwidth can be achieved because the reuse factor for regular TRX cells in an IUO planned network can be reduced. This reduction would be expected to increase the overall interference of the network. However, the handover method described above makes it possible to remotely analyse co-channel interference in adjacent cells. This remote analysis of adjacent co-channel interference, which affords the mobile station the opportunity of being handed over to an adjacent cell having one of the lowest levels of co-channel interference, can overcome the increased interference of the tighter reuse factor of the regular IUO frequency $TRX_1$ s.

Several factors affect the amount by which an intelligent handover protocol and/or an intelligent intracell handover protocol as described herein increase the efficiency of usage of bandwidth in a limited bandwidth network (e.g. a GSM network). One factor to note is that the more frequencies used in a network the greater the advantage that would be expected to be achieved. The protocols are especially advantageous within cells where there are a higher number of carrier frequencies, i.e. $TRX_{2,3...N}$ increased bandwidth efficiency increasing with higher N.

The mobile station could be capable of determining the adjacent cell co-channel interference to varying degrees, to match the different processing requirements of different base station controllers' functionalities. The mobile station could perform some or all of the processing described above as being performed on the network side, and vice versa. This may make it easier to overlay a system of this type on an existing network. Alternative and/or additional devices to the Viterbi equaliser may be provided in the mobile station to perform co-channel interference evaluation of the monitored adjacent cell first carrier frequencies. For example, the monitoring could be performed by measuring data rate and/or error rate (e.g. bit error rate) for a communication on a principal or broadcast channel or a dedicated measurement channel. The system could provide programmed coded signals carried by dedicated time slots in the network for the purpose of monitoring the co-channel interference.

There is no need for co-channel interference evaluation to be restricted to the principal carrier frequencies. Correspondingly, the BSC may be programmed to instruct the mobile station to monitor any carrier frequency of an adjacent cell, preferably after that cell/frequency has been identified as a potential candidate for handover. The necessary modifications to the power transmission requirements of that carrier frequency in the adjacent base station could be logically inferred.

It is also possible to use the data that can be gathered in a system of the type described above to help in network management, to provide additional information that could be of use to network operators, for instance for network planning purposes. As an example, engineers may be installing an indoor network to provide an indoor coverage solution to complement an existing outdoor network. During such an operation, the engineers may be investigating which subset of available base station frequencies of a larger number of possible frequencies are subject to the least interference at a particular location. By means of handsets and/or network-side apparatus equipped as described above it is relatively easy for the engineers to make a sound choice for frequency allocation for the said indoor base stations based upon this quality criterion.

The handover and other procedures described above could be implemented in an existing GSM network by means of software and/or hardware modifications to existing network equipment of at least 2nd and 3rd generation GSM systems.

The embodiment described emphasises a network-based handover decision, however, in some technologies, e.g. TETRA, the handover decision is mobile based. The method of the invention is equally advantageous for mobile based handover decisions and is thus equally applicable to systems such as TETRA.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method for operating a radio telecommunications system comprising a mobile station and two or more cell site units each capable of communicating by radio with the mobile station on at least two communication channels having different frequencies; wherein the mobile station is in traffic communication on a traffic communication channel with at least two of the cell site units; the method comprising:

the mobile station receiving signals for each of said two or more cell site units on each of the at least two communication channels;

the mobile station determining an estimate of the level of interference with signals on each of the at least two communication channels for each of said two or more cell site units;

the mobile station communicating to a handover controller the estimate of the level of interference with signals with each of the at least two communication channels for each of said two or more cell site units; and the handover controller determining to which of the cell site units to hand over traffic communication of the mobile station on the basis of at least the estimates of the level of interference with signals on each of the at least two communication channels for each of the two or more cell site units.

2. A method as claimed in claim 1, comprising the step of transmitting to the mobile information specifying the at least two communication channels.

3. A method as claimed in claim 2, wherein the said information specifies a frequency for each of the at least two communication channels.

4. A method as claimed in claim 3, wherein the said step of receiving comprises receiving signals on communication channels whose carrier frequencies are specified by the said information.

5. A method as claimed in claim 1, comprising the step of the mobile station transmitting to a cell site unit information indicating the estimated levels of interference with signals on at least two of the communication channels.

6. A method as claimed in claim 1, wherein the step of the handover control unit determining comprises determining to which communication channel of one of the cell site units to hand over traffic communication of the mobile station on the basis of at least that information indicating the estimated levels of interference.

7. A method as claimed in claim 6, wherein the handover control unit determines to hand over to a channel having one of the lowest estimated levels of interference.

8. A method as claimed in any of claim 1, wherein the mobile station stores an indication of a timing of the said signals on at least one of the communication channels and the mobile station interrupts another operation to receive the said signals at a time dependent on the stored indication of a timing.

9. A method as claimed in claim 8, wherein the indication of a timing is an indication of the difference in timing between signals on the said communication channels.

10. A mobile station for operation in a telecommunications system comprising at least two cell site units, wherein the mobile station is in traffic communication on a traffic communication channel with at least two of the cell site units, each cell site unit being capable of communicating by radio with the mobile station on at least two communication channels having different frequencies; the mobile station comprising:

a receiver capable of receiving signals from a cell site unit on a communication channel;

an interference estimation unit for estimating the level of interference on a communication channel on which the receiver receives signals;

a channel analysis unit coupled to the receiver and the interference estimation unit for causing the receiver to receive signals from each of the cell site units on each of the respective communication channels in turn and receiving from the interference estimation unit an estimate of the level of interference on each of the at least two channels; and a transmitter coupled to the channel analysis unit for transmitting to the mobile station communicating to a handover controller the estimate of the level of interference with signals with each of the at least two communication channels for each of the at least two cell site units;

wherein the mobile device is arranged to perform a handover in dependence on the handover controller determining to which of the cell site units to hand over traffic communication of the mobile station on the basis of at least the estimates of the level of interference with signals on each of the at least two communication channels for each of the at least two cell site units.

11. A mobile station as claimed in claim 10, wherein the interference estimation unit is capable of estimating the level of interference by performing an error correction and/or signal recovery operation on received signals.

12. A mobile station as claimed in claim 11, wherein the said operation is performed on a training sequence of the received signals.

13. A mobile station as claimed in claim 12, wherein the interference estimation unit comprises a Viterbi equaliser.

14. A mobile station as claimed in claim 11, wherein the interference estimation unit comprises a Viterbi equaliser.

15. A mobile station as claimed in claim 14, wherein the channel analysis unit is capable of receiving via the receiver information specifying the said communication channels.

16. A mobile station as claimed in claim 10, wherein the channel analysis unit is capable of receiving via the receiver information specifying the said communication channels.

17. A method for operating a radio telecommunication system comprising a mobile station and two or more cell site units, wherein the mobile station is in traffic communication on a traffic communication channel with at least two of the cell site units, each cell site unit being capable of communicating by radio with the mobile station on at least two communication channels having different frequencies; the method comprising:

the mobile station storing an indication of the timing difference between signals on the communication channels;

the mobile station receiving signals on one of the communication channels; and the mobile station interrupting said receiving in order to receive signals on another of the communication channels at a time dependent on the stored indication;

the mobile station determining an estimate of the level of interference with signals received on each of the communication channels for each of the two or more cell site units;

the mobile station communicating to a handover controller the estimate of the level of interference with signals with each of the communication channels for each of the two or more cell site units; and the handover controller determining to which of the cell site units to hand over traffic communication of the mobile station on the basis of at least the estimates of the level of interference with signals on each of the communication channels for each of the two or more cell site units.

* * * * *